(12) United States Patent
Yoshida et al.

(10) Patent No.: US 6,316,096 B1
(45) Date of Patent: Nov. 13, 2001

(54) BIAXIALLY ORIENTED POLYESTER FILM FOR USE IN THERMOSENSITIVE STENCIL PRINTING BASE SHEET

(75) Inventors: Tetsuo Yoshida; Hirofumi Murooka, both of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/555,368

(22) PCT Filed: Sep. 29, 1999

(86) PCT No.: PCT/JP99/05342

§ 371 Date: May 30, 2000

§ 102(e) Date: May 30, 2000

(87) PCT Pub. No.: WO00/20490

PCT Pub. Date: Apr. 13, 2000

(30) Foreign Application Priority Data

Oct. 1, 1998 (JP) .................................................. 10-279750
Oct. 5, 1998 (JP) .................................................. 10-282713
Oct. 6, 1998 (JP) .................................................. 10-284006
Oct. 6, 1998 (JP) .................................................. 10-284007

(51) Int. Cl.$^7$ .............................. B32B 27/20; B32B 27/36
(52) U.S. Cl. ......................... 428/331; 428/338; 428/480; 428/910; 525/437; 525/444
(58) Field of Search ..................................... 428/323, 331, 428/332, 338, 480, 910; 525/437, 444

(56) References Cited

U.S. PATENT DOCUMENTS 5,466,521 * 11/1995 Sato et al. ............................ 428/330
5,514,462  5/1996 Endo et al. .......................... 428/323

FOREIGN PATENT DOCUMENTS

| | | |
|---|---|---|
| 41-7623 | 4/1941 | (JP) . |
| 55-103957 | 8/1980 | (JP) . |
| 59-143679 | 8/1984 | (JP) . |
| 62-149496 | 7/1987 | (JP) . |
| 3-39294 | 2/1991 | (JP) . |
| 6-312588 | 11/1994 | (JP) . |
| 09-099667 * | 4/1997 | (JP) . |
| 9-164782 | 6/1997 | (JP) . |
| 9-220867 | 8/1997 | (JP) . |

* cited by examiner

*Primary Examiner*—Vivian Chen
(74) *Attorney, Agent, or Firm*—Sughrue, Mion, Zinn, Macpeak & Seas, PLLC

(57) ABSTRACT

A biaxially oriented polyester film:
(A) which comprises a composition comprising at least two thermoplastic polyesters;
(B) which has at least two melting peaks which satisfy difference between being in range of 5 to 20° C. and average of the both melting peak temperature being in range of 200 to 230° C. when measured by DSC at a temperature elevation rate of 2° C./min by superimposing a periodic temperature variation of ±1° C./min; the highest melting peak temperature (° C.) and the lowest melting peak temperature (° C.);
(C) which has on the film plane two crossing directions having a thermal shrinkage factor at 100° C. for 10 minutes of 16 to 25%; and
(D) which has a thickness of 0.2 to 7 μm.

This film is suitable for use in a thermosensitive stencil printing base sheet which enables clear character printing and solid printing, is free from nonuniformity in printing thickness, nonuniformity in printing density and wrinkles, and excellent in durability, and has high perforation sensitivity.

10 Claims, No Drawings

BIAXIALLY ORIENTED POLYESTER FILM FOR USE IN THERMOSENSITIVE STENCIL PRINTING BASE SHEET

FIELD OF THE INVENTION

The present invention relates to a biaxially oriented polyester film. More specifically, it relates to a biaxially oriented polyester film suitable for use in a thermosensitive stencil printing base sheet which has high printing sensitivity, is free from nonuniformity in the thickness and density of printed characters and figures and allows for clear stencil making and printing.

PRIOR ART

In recent years, much attention has been paid to thermosensitive stencil printing using a base sheet which is perforated by heating with a xenon flash lamp, thermal head or pulse radiation such as laser beams. The principle of this stencil making method is disclosed by JP-B 41-7623 (the term "JP-B" as used herein means an "examined Japanese patent publication"), and JP-A 55-103957 and JP-A 59-143679 (the term "JP-A" as used herein means an "unexamined published Japanese patent application").

A base sheet prepared by laminating together a film for a thermosensitive stencil printing base sheet and a porous base with an adhesive or by heat has been used as the base sheet used for thermosensitive stencil printing. A vinyl chloride film, vinylidene chloride copolymer film, polypropylene film and highly crystalline polyethylene terephthalate film have been used as the film for a thermosensitive stencil printing base sheet, and thin paper and polyester sheet have been used as the porous base.

However, they have the following disadvantages.
1) When a vinyl chloride or vinylidene chloride copolymer film is used as the film for a base sheet, printed characters are not clear.
2) When a polypropylene or polyethylene terephthalate film is used as the film for a base sheet, clear characters can be obtained but a clear image cannot be obtained by solid printing (a symbol or figure like a circle the inside of which is totally printed black and which has a large ink adhesion area, to be referred to as "solid printing" hereinafter).
3) A printed portion has nonuniformity in printing density.
4) A printed character is partially nonuniform in thickness.
5) Sensitivity is low and a light black printed character or the like cannot be obtained.

To eliminate the above disadvantages, JP-A 62-149496 proposes use of a film having small crystal fusion energy. However, this film involves such problems as blocking which occurs when a polymer chip is dried during the production process of the film and the adhesion of the edges of a longitudinally stretched film to the clip of a tenter type transverse stretching machine. Further, this film has a problem with printing quality that a polymer which is softened at the time of perforation is easily adhered to a thermal head and that a streak-like reversal marks are formed by the adhered polymer at the time of continuous stencil making. To solve these problems, JP-A 3-39294 proposes a film which shows two or more melting peaks in DSC temperature-elevation measurement and has already been put to practical use. However, there is a case where the sensitivity of this film as a thermosensitive stencil printing base sheet becomes insufficient for hardware for high-speed printing.

SUMMARY OF THE INVENTION

It is an object of the present invention to provide a biaxially oriented polyester film which is useful as a thermosensitive stencil printing base sheet.

It is another object of the present invention to provide a biaxially oriented polyester film suitable for use as a film for a thermosensitive stencil printing base sheet which enables clear character printing and solid printing, is free from nonuniformity in printing thickness, nonuniformity in printing density and wrinkles, and excellent in durability, and has high perforation sensitivity.

Other objects and advantages of the present invention will become apparent from the following description.

According to the present invention, the above objects and advantages of the present invention are attained by a biaxially oriented polyester film:
(A) which comprises a composition comprising at least two thermoplastic polyesters;
(B) which has at least two melting peaks which satisfy the following expressions (1) and (2) when measured by DSC at a temperature elevation rate of 2° C./min by superimposing a periodic temperature variation of ±1° C./min:

$$5° C. \leq Tmp(max) - Tmp(min) \leq 20° C. \tag{1}$$

$$200° C. \leq \tfrac{1}{2}(Tmp(max) + Tmp(min)) \leq 230° C. \tag{2}$$

wherein Tmp(max) is the highest melting peak temperature (° C.) and Tmp(min) is the lowest melting peak temperature (° C.);
(C) which has on the film plane two crossing directions having a thermal shrinkage factor at 100° C. for 10 minutes of 16 to 25%; and
(D) which has a thickness of 0.2 to 7 $\mu$m.

The thermoplastic polyester resin used in the present invention is a polyester which shows plastic fluidity by heating, preferably a polyester which is essentially composed of a linear polymer chemically structurally. It may further contains a low molecular weight oligomer.

Typical examples of the thermoplastic polyester resin used in the present invention include polycarbonates such as polyethylene terephthalate, polybutylene terephthalate, polyethylene-2,6-naphthalene dicarboxylate, polycyclohexanedimethyl tere(iso)phthalate, polyethylene-$\alpha,\beta$-bis(2-chlorophenoxy)ethane-4,4-dicarboxylate and bisphenol A polycarbonate. In the present invention, homopolymers and copolymers of these polyesters are preferably used. The thermoplastic polyester resin in the present invention may contain a resin other than a polyester in limits that do not depart from the scope of the present invention.

That is, the film of the present invention may be not only a film which forms uniform composition microscopically, as exemplified by a homopolymer, alternating copolymer, random copolymer and compatible polymer blend but also a film which forms nonuniform composition microscopically, as exemplified by a block copolymer, graft copolymer and semi-compatible or non-compatible polymer blend if the macroscopical thermal properties (DSC behavior) and dynamic properties (dynamically viscoelastic behavior) of the film as a plane satisfy the above relationship (B). As for layer structure, the film may be single-layer or multi-layer (more than 2 layers). As for uniformity in the macroscopical thermal properties of the film as a plane, the thermal properties are desirably uniform in an area of at least 50 $\mu$m$^2$ or less, preferably 30 $\mu$m$^2$ or less, more preferably 10 $\mu$m$^2$ or less. When the thermal properties are uniform only in an area of 50 $\mu$m$^2$ or more, perforation properties differ by each dot of the thermal head, whereby printing density easily becomes nonuniform.

In the present invention, preferably, the composition comprising at least two thermoplastic polyesters comprises 30 to 70 wt % of a first aromatic polyester which comprises terephthalic acid as the main dicarboxylic acid component and ethylene glycol has the main glycol component, 30 to 70 wt % of a second aromatic polyester which comprises terephthalic acid as the main dicarboxylic acid component and tetramethylene glycol as the main glycol component, and 0 to 30 wt % of a third aromatic polyester which comprises terephthalic acid as the main dicarboxylic acid component and hexamethylene glycol as the main glycol component.

More preferably, the composition comprising at least two thermoplastic polyesters comprises 35 to 65 wt %, preferably 40 to 60 wt % of the first aromatic polyester, 35 to 65 wt %, preferably 40 to 60 wt % of the second aromatic polyester, and 0 to 15 wt %, preferably 0 to 10 wt % of the third aromatic polyester.

When the composition comprising at least two thermoplastic polyesters comprises three different aromatic polyesters, preferably, the first aromatic polyester is a poly(ethylene terephthalate/isophthalate)copolymer, the second aromatic polyester is polytetramethylene terephthalate, and the third aromatic polyester is a poly(hexamethylene terephthalate/isophthalate)copolymer.

In the present invention, the composition comprising at least two thermoplastic polyesters may contain spherical silica. The spherical silica preferably has an aspect ratio of 1.0 to 1.2 and two peaks within a particle diameter range of 0.5 to 3.0 μm and a particle diameter range of 0.05 to 0.6 μm in a particle size distribution curve, the particle diameter ratio of the two peaks (large particle diameter/small particle diameter) being in the range of 1.5 to 20.

When the peak particle diameter in the particle size distribution curve is larger than 3.0 μm, perforation sensitivity lowers disadvantageously and when the peak particle diameter is smaller than 0.5 μm, slipperiness becomes insufficient. When the peak particle diameter is smaller than 0.05 μm, the effect of improving slipperiness becomes unsatisfactory and when the peak particle diameter is larger than 0.6 μm, it is difficult to achieve both slipperiness and sensitivity at the same time. When the peak particle diameter ratio (large particle diameter/small particle diameter) is larger than 20 or smaller than 1.5, it is difficult to achieve both slipperiness and sensitivity at the same time. When the aspect ratio (long diameter/short diameter) is larger than 1.2 or smaller than 1.0, slipperiness changes according to orientation.

In the particle size distribution curve, the two peak particle diameters are preferably 0.8 to 2.4 μm and 0.05 to 0.5 μm, more preferably 1.2 to 1.8 μm and 0.1 to 0.4 μm.

The above spherical silica consists of two different kinds of spherical silicas which show different peak particle diameters in the particle size distribution curve. The two different kinds of spherical silicas preferably have a standard deviation of less than 0.5, more preferably less than 0.1.

When the standard deviation is equal to or larger than 0.5, it is difficult to achieve both perforation sensitivity and film slipperiness, namely, winding properties at the same time.

The total content of the spherical silica in the film is preferably 0.01 to 2 wt %, more preferably 0.1 to 1 wt %. When the total content is smaller than 0.01 wt %, it is difficult to improve slipperiness and when the total content is larger than 2 wt %, breakage occurs frequently during the production of a film, thereby making it difficult to produce the film stably.

The film of the present invention is made from at least two thermoplastic polyester resins as described above. The film has two or more melting peaks measured by DSC at a temperature elevation rate of 2° C./min by superimposing a periodic temperature variation of ±1° C./min.

The above expressions (1) and (2) must be established between the two or more melting peaks.

That is, as the film has a melting peak at a relatively low temperature range, it is easily perforated and as the film also has a melting peak at a high temperature range, each hole can be expanded, the shape of each hole can be retained, and sufficiently high mechanical strength is provided to the film. The difference (Tmp(max)−Tmp(min)) between the highest melting peak temperature Tmp(max) and the lowest melting peak temperature Tmp(min) must be in the range of 5 to 20° C. This temperature difference depends on the two or more thermoplastic polyester resins of the film and the progress of the ester exchange reaction of a mixture of these. When the temperature difference is smaller than 5° C., the ester exchange reaction proceeds excessively, whereby the crystallinity of a polymer greatly lowers. Therefore, when the film is perforated to prepare a thermosensitive stencil, it easily sticks to Japanese paper or the like, thereby resulting in a reduction in the sensitivity of the base sheet disadvantageously. When the difference is larger than 20° C., the progress of the ester exchange reaction is too slow, whereby melting energy does not lower and the sensitivity of the film to perforation energy deteriorates disadvantageously. Further, the mean value of Tmp(max) and Tmp(min) of the film, that is, (Tmp(max)+Tmp(min))/2 is 200° C. or more, preferably 205° C. or more, more preferably 210° C. or more and less than 230°, preferably 225° C. or less. When the mean value is smaller than 200° C., the melting point of the polymer becomes too low, making it difficult to form a film and when the mean value is larger than 230° C., the melting point of the polymer becomes too high, resulting in the formation of a film having low perforation sensitivity.

In the present invention, the two or more melting peaks can be two or more clearly distinguishable peaks, or one melting peak and other melting peak(s) which appear at the shoulder of the peak. The melting peak(s) at the shoulder will be defined hereinafter.

The film of the present invention has on the plane two crossing directions having a heat shrinkage factor at 100° C. for 10 minutes of 16 to 25%. For example, the film of the present invention has a heat shrinkage factor (SMD) in a longitudinal direction and a heat shrinkage factor in a transverse direction (STD) at 100° C. for 10 minutes of 16 to 25%, respectively. When the heat shrinkage factors are smaller than 16%, the stencil making sensitivity of the film lowers, which may cause a practical problem. When the heat shrinkage factors are larger than 25%, it is difficult to retain the shape of each hole.

Preferably, the film of the present invention has on the plane two crossing directions having a heat shrinkage factor at 60° C. for 120 minutes of 2% or less. For example, the film of the present invention has a heat shrinkage factor in a longitudinal direction (SMD) and a heat shrinkage factor in a transverse direction (STD) at 60° C. for 120 minutes of 2% or less. When the heat shrinkage factors are larger than 2%, if a thermosensitive stencil printing base sheet as a final product is exposed to a temperature around 60° C. or higher than 60° C. during transportation or storage, the film shrinks, whereby the base sheet may be wrinkled or curled. The base sheet which experiences this phenomenon easily has low storage properties and low product value. As means of adjusting the heat shrinkage factor at 60° C. for 120 minutes to 2% or less, for example, a method in which a film roll is kept in a thermostatic oven heated at 50 to 55° C. for 3 days or more before it is formed into a thermosensitive stencil printing base sheet is advantageously employed.

Preferably, the film of the present invention has on the plane two crossing directions in which the difference between load at 50% elongation and load at 10% elongation when calculated based on a thickness of 1.5 μm and a width of 10 mm in a tensile test is in the range of 0.02 to 0.20 kgf. For example, the difference (ΔF) between load at 50% elongation and load at 10% elongation when calculated based on a thickness of 1.5 μm and a width of 10 mm in the tensile test is 0.02 to 0.20 kgf in each of longitudinal and transverse directions.

When this difference (ΔF) is smaller than 0.02 kgf, the molecular alignment of the film is low, the expansion of each hole at the time of perforation is apt to be insufficient and thickness nonuniformity is liable to large, whereby the slipperiness of the obtained thermosensitive stencil printing base sheet is apt to deteriorate, resulting in reduced sensitivity. When the difference is larger than 0.20 kgf, the molecular alignment becomes too high, whereby film breakage occurs frequently during film formation, making difficult stable production. More preferably, the difference (ΔF) is in the range of 0.08 to 0.17 kgf.

To obtain the above difference (ΔF), the area draw ratio for film formation is preferably 14 times or more.

The film of the present invention must be biaxially oriented. A uniaxially stretched or unstretched film has nonuniformity in perforation and defective parts even after printing. The degree of biaxial orientation is not particularly limited but preferably in the range of 0.120 to 0.140 in terms of plane orientation coefficient.

In the present invention, the thickness of the biaxially oriented film must be 0.2 to 7 μm. It is preferably 0.5 to 5 μm, more preferably 0.8 to 3.5 μm. When the thickness is smaller than 0.2 μm, it is difficult to laminate the obtained polyester film on a porous base to produce a thermosensitive stencil printing base sheet, and a printed image is liable to be unclear, nonuniform in printing density and low printing resistance. When the thickness is larger than 7 μm, perforation sensitivity becomes low, and a printed image has a missing part or becomes nonuniform in thickness disadvantageously.

The film of the present invention preferably has an intrinsic viscosity of 0.50 or more and less than 0.62. When the intrinsic viscosity is higher than 0.62, the film is hardly crystallized due to its high viscosity, thereby making it difficult to retain its perforation shape. When the intrinsic viscosity is lower than 0.50, film formability greatly lowers.

The film of the present invention is obtained by fully drying under predetermined condition a resin raw material obtained by copolymerizing, blending or laminating a thermoplastic polyester resin component having a melting peak at a higher temperature range with a thermoplastic polyester resin component having a melting peak at a lower temperature range, supplying the resin raw material to an extruder, melting and forming it into a film from a slit die (for example, T-die) or by an inflation casting method and biaxially stretching the film. Biaxial stretching is not particularly limited but it may be sequential biaxial stretching or simultaneous biaxial stretching (stenter method or tube method). The thus obtained biaxially oriented film may be heat set or relaxed.

For example, the film is stretched in a longitudinal direction to preferably 3.0 to 4.8 times at 40 to 90° C., more preferably 3.3 to 4.5 times at 45 to 75° C., particularly preferably 3.5 to 4.2 times at 50 to 70° C. The film is stretched in a transverse direction to preferably 3.0 to 4.8 times at 40 to 90° C., more preferably 3.3 to 4.5 times at 45 to 75° C., particularly preferably 3.5 to 4.5 times at 50 to 70° C. The film is heat set at preferably 80 to 150° C. for 1 to 60 seconds, more preferably 80 to 135° C. for 1 to 40 seconds, particularly preferably 80 to 120° C. for 1 to 20 seconds. The film is thermally relaxed by preferably 10% or less at 40 to 75° C., more preferably 7% or less at 40 to 70° C., particularly preferably 5% or less at 55 to 70° C.

The biaxially oriented polyester film of the present invention is advantageously used in a thermosensitive stencil printing base sheet. The expression "thermosensitive stencil printing base sheet" means a laminate which is perforated by heating with a xenon flash lamp, thermal head or laser beams and consists of a polyester film and a porous base. This polyester film forms a portion of the base sheet on which characters are printed and which is perforated when it is exposed to flashlight or contacted to a thermal head.

The step of perforating the film can be divided into the following three stages.

1) A portion to which heat energy is applied by contact to the thermal head or exposure to an electromagnetic wave (xenon flash lamp light, laser pulses or the like) is softened or molten to be perforated.
2) A surrounding polymer to which heat energy is applied and which is softened to be perforated is heat shrunk and fluidized by diffused heat energy to expand each hole.
3) A softened polymer is pulled to a portion around a hole by heat shrinkage force, solidified by natural cooling and heat radiation, and a hole end portion is formed to retain the shape of the hole.

Therefore, an additive and the like having an absorption peak at the wavelength of flashlight to which the film is exposed may be added to the film of the present invention. To improve adhesion to the porous base, the surface of the film may be treated with corona discharge in the air, carbonic acid gas or nitrogen gas. When a lubricant or surfactant is applied to or kneaded into the film of the present invention, the releasability of the film from the base sheet is improved advantageously. To improve the slipperiness of the film, an organic or inorganic additive may be contained.

The porous base to be laminated with the film of the present invention is not particularly limited but is typified by Japanese paper, "Tengu-harigami", synthetic fiber sheet-formed paper, fabrics and non-woven fabrics. The weight of the porous base used is not particularly limited but it is generally 2 to 20 g/m², preferably 5 to 15 g/m². When a mesh sheet is used, a sheet woven of 20 to 60 μm thick fibers may be used and a sheet having a lattice interval of 20 to 250 μm is preferably used.

The adhesive to be used for laminating the film of the present invention with the porous base is a vinyl acetate-based resin, acrylic resin, urethane-based resin or polyester-based resin.

EXAMPLES

The following examples are given to further illustrate the present invention. The present invention is not limited by the following examples without departing from the scope of the present invention. The values of physical properties and characteristic properties in the present invention were measured and defined as follows.

(1) melting peak temperature Tmp(° C.) (Tmp(min), Tmp(max)) 10 mg of a film is heated at a temperature elevation rate of 2° C./min with an amplitude of 1° C./min in an N2 air stream using the TA Instruments Thermal Analyst 2100 to analyze the heat absorption behavior by melting of the film with primary differentiation and secondary differentiation so as to determine a peak temperature or a shoulder temperature. This temperature is taken as a melting peak temperature.

(2) intrinsic viscosity ([η])

This is measured at 25° C. using o-chlorophenol as a solvent and the unit of this is 100 cc/g.

(3) heat shrinkage factor

Five film samples marked for intervals of 30 cm in both longitudinal and transverse directions are placed in a gear oven heated at 100° C. and left for 10 minutes to measure the intervals between the marks. The mean of values obtained by the following expression is taken as heat shrinkage factor.

heat shrinkage (%)=(30 cm—interval between marks after heating, cm)/30 cm×100

(4) evaluation of character printing (4-1) evaluation of clearness of character

A JIS first standard character is printed as an original having a character size of 1.5×1.5 mm on printing a base sheet formed by laminating together a polyester porous base and a thermosensitive film (likewise in both Examples and Comparative Examples) using the "RISO Meishi Gokko" stencil making and printing machine (of Riso Kagaku Kogyo Co., Ltd.) as a flashlight perforation system or the PRIPORT SS950 digital printing machine (of Ricoh Co., Ltd.) as a thermal head perforation system and evaluated as follows. Out of the evaluation results of the flashlight perforation system and thermal head perforation system, worse results are shown as the final evaluation of Examples and Comparative Examples. Evaluation was carried out with the naked eye and based on grades A, B and C.

A: character appears exactly the same as original

B: lines are partly disconnected or connected unlike original but character is legible C: lines are disconnected or connected and character is almost illegible (4-2) evaluation of missing part of character Stencil making and printing are carried out in the same manner as in (4-1) and a missing part of a character is evaluated based on the following criteria.

○: no missing part

Δ: a missing part is slightly observed (but legible)

X: there is obviously a missing part (4-3) evaluation of nonuniformity in thickness of character A character as big as 4.5×4.5 mm is printed using the same stencil making and printing machine as in (4-1) and the printed state of the character is observed with the naked eye and evaluated based on the following criteria.

○: printed character has a good appearance without no thickness nonuniformity and can be used X: printed character has obviously thickness nonuniformity compared with character of original and cannot be used (4-4) evaluation of thickness of character A character is printed in the same manner as in (4-3) and changes in the thickness of the character are observed with the naked eye and evaluated based on the following criteria.

○: no change in thickness

Δ: character becomes slightly thicker or thinner but can be used

X: character obviously thicker or thinner than character of original and cannot be used (5) evaluation of solid printing (5-1) evaluation of clearness of solid printing A black circle (the inside of the circle is printed black) having a diameter of 1 to 5 mm is used as an original and printed in the same manner as in (4-1) to evaluate the (partial) irregularities of the outline of the circle based on the size of original as following criteria.

○: irregularities are larger or smaller than the size of original by 45 μm or less (clear and usable)

Δ: irregularities are larger or smaller than the size of original by more than 45 μm and less than 150 μm (partly usable)

X: irregularities are larger or smaller than the size of original by 150 mm or more (poor appearance, unclear and not usable)

(5-2) correspondence with original size of solid printing

A circle is printed in the same manner as in (5-1) and the size thereof is measured in all directions (0° and 180°, 45° and 225°, 90° and 270°, 135° and 315°), compared with the size of an original and evaluated based on the following criteria.

○: Size changes from original in all directions are 45 μm or less (good correspondence)

Δ: intermediate between ○ and X

X: A size change from original in one direction is 450 μm or more (bad correspondence)

(5-3) evaluation of nonuniformity in density of solid printing

A circle is printed in the same manner as in (5-1) to check if there is nonuniformity in the density of solid printing with the naked eye. Solid printing is evaluated as X when there is nonuniformity in the density of solid printing and ○ when there is no nonuniformity.

(6) evaluation of sensitivity

Originals are prepared by writing a character under a pressing load of 145 g with five pencils having different hardnesses of 5H, 4H, 3H, 2H and H. The sensitivity is evaluated according to whether each of the written character on the originals is legible or not. An original is judged as the most sensitive when the lightest character written in 5H on the original is legible and originals are judged as less sensitive when only the character written with less hard pencils on the originals is legible.

(7) evaluation of storage properties

The laminated base sheet is left in a gear oven heated at 60° C. for 2 hours and its wrinkling and curling are evaluated with the eye based on the following criteria.

○: base sheet experiences no change which interferes with its practical use before and after it is left in gear oven X: base sheet experiences a change which interferes with its practical use before and after it is left in gear oven Examples 1 to 11 and Comparative Examples 1 to 10

Polyethylene terephthalate (abbreviated as PET) having an [η] of 0.65, polybutylene terephthalate (abbreviated as PBT) having an [η] of 1.1, 0.9 or 0.7, a polyethylene terephthalate.isophthalate copolymer containing 5, 10, 15 or 25 mol % of isophthalate and having an [η] of 0.65 (abbreviated as PET/IA5, PET/IA10, PET/IA15 and PET/IA25, respectively) and a polyhexamethylene terephthalate.isophthalate copolymer containing 3 mol % of PET and isophthalate and having an [η] of 1.30 (abbreviated as PHMT/IA3) were used as raw materials of thermoplastic polyester resin.

The above raw materials were mixed in mixing ratios shown in Table 1, fully dried, supplied to an extruder, melt extruded at a temperature suitable for resin composition used which is selected from a range of 245 to 310° C., and solidified by cooling with a casting drum having a surface temperature of 20° C. in accordance with an electrostatic casting method to form unstretched films having a thickness shown in Table 1. In Comparative Examples 4 and 5, the raw materials were extruded at a temperature 20° C. lower than the extrusion temperature of Example 1 and a residence time in an extrusion system ½ that of Example 1.

The unstretched films were stretched in biaxial directions sequentially at draw ratios and draw temperatures shown in Table 1, cooled and then heat set at 100 to 150° C. while being relaxed by 2%. The results are shown in Table 1 and Table 2.

The thus obtained biaxially oriented films having a thickness of 1.6 μm were laminated with a polyester sheet (made from polyethylene terephthalate fibers) and evaluated by a stencil making and printing machine. The results are shown in Table 3.

TABLE 1

| | film composition | | | | mixing ratio (wt %) | | | | thickness |
|---|---|---|---|---|---|---|---|---|---|
| | polymer A | polymer B | polymer C | polymer D | A | B | C | D | 1.6 |
| Ex. 1 | PHMT/IA3 | PBT | — | PET/IA10 | 5 | 45 | — | 50 | 1.6 |
| Ex. 2 | PHMT/IA3 | PBT | — | PET/IA10 | 5 | 45 | — | 50 | 1.6 |
| Ex. 3 | PHMT/IA3 | PBT | — | PET/1A15 | 5 | 45 | — | 50 | 1.6 |
| Ex. 4 | — | PBT | — | PET/IA10 | — | 45 | — | 55 | 1.6 |
| Ex. 5 | PHMT/IA3 | PBT | — | PET/IA10 | 5 | 45 | — | 50 | 1.6 |
| Ex. 6 | PHMT/IA3 | PBT | — | PET/IA10 | 5 | 45 | — | 50 | 1.6 |
| Ex. 7 | PHMT/IA3 | PBT | — | PET/IA10 | 5 | 45 | — | 50 | 1.6 |
| Ex. 8 | PHMT/IA3 | PBT | — | PET/IA10 | 5 | 45 | — | 50 | 1.6 |
| Ex. 9 | PHMT/IA3 | PBT | — | PET/IA10 | 20 | 40 | — | 40 | 1.6 |
| Ex. 10 | PHMT/IA3 | PBT | — | PET/IA10 | 10 | 35 | — | 45 | 1.6 |
| Ex. 11 | PHMT/IA3 | PBT | — | PET/IA10 | 30 | 45 | — | 35 | 1.6 |
| C. Ex. 1 | PHMT/IA3 | PBT | PET | PET/IA10 | 5 | 45 | 30 | 20 | 1.6 |
| C. Ex. 2 | PHMT/IA3 | PBT | — | PET/IA5 | 5 | 45 | — | 50 | 1.6 |
| C. Ex. 3 | PHMT/IA3 | PBT | — | PET/IA10 | 5 | 45 | — | 50 | 1.6 |
| C. Ex. 4 | PHMT/IA3 | PBT | — | PET/IA10 | 5 | 45 | — | 50 | 1.6 |
| C. Ex. 5 | PHMT/IA3 | PBT | — | PET/IA10 | 5 | 45 | — | 50 | 1.6 |
| C. Ex. 6 | — | PBT | — | PET/IA25 | — | 45 | — | 55 | 1.6 |
| C. Ex. 7 | PHMT/IA3 | PBT | PET | PET/IA10 | 5 | 45 | 30 | 20 | 1.6 |
| C. Ex. 8 | PHMT/IA3 | PBT | — | PET/IA10 | 5 | 45 | — | 50 | 1.6 |
| C. Ex. 9 | PHMT/IA3 | PBT | — | PET/IA10 | 5 | 45 | — | 50 | 1.6 |
| C. Ex. 10 | PHMT/IA3 | PBT | — | PET/IA10 | 5 | 45 | — | 50 | 7.1 |

| | Tmp (° C.) | | | | draw | | | | heat setting | relaxation |
|---|---|---|---|---|---|---|---|---|---|---|
| | | | Tmp (max) − | (Tmp (max) + | temperature | | draw ratio | | temperature | ratio |
| | min | max | Tmp (min) | Tmp (min))/2 | MD | TD | MD | TD | area | (° C.) | (%) |
| Ex. 1 | 212 | 223 | 11 | 218 | 60 | 65 | 4.0 | 4.1 | 16.4 | 92 | 2 |
| Ex. 2 | 214 | 225 | 11 | 220 | 60 | 65 | 4.0 | 4.1 | 16.4 | 92 | 2 |
| Ex. 3 | 210 | 222 | 12 | 216 | 60 | 65 | 4.0 | 4.1 | 16.4 | 90 | 2 |
| Ex. 4 | 223 | 230 | 7 | 227 | 60 | 65 | 4.0 | 4.1 | 16.4 | 97 | 2 |
| Ex. 5 | 212 | 223 | 11 | 218 | 60 | 65 | 3.8 | 4.0 | 15.2 | 92 | 2 |
| Ex. 6 | 212 | 223 | 11 | 218 | 60 | 65 | 4.1 | 4.3 | 17.6 | 90 | 2 |
| Ex. 7 | 212 | 223 | 11 | 218 | 60 | 65 | 4.0 | 4.1 | 16.4 | 92 | 2 |
| Ex. 8 | 212 | 223 | 11 | 218 | 60 | 65 | 4.0 | 4.1 | 16.4 | 86 | 2 |
| Ex. 9 | 208 | 220 | 12 | 214 | 55 | 60 | 4.0 | 4.1 | 16.4 | 92 | 2 |
| Ex. 10 | 206 | 222 | 16 | 214 | 55 | 60 | 4.0 | 4.1 | 16.4 | 92 | 2 |
| Ex. 11 | 210 | 218 | 8 | 214 | 55 | 60 | 4.0 | 4.1 | 16.4 | 92 | 2 |
| C. Ex. 1 | 207 | 235 | 28 | 221 | 65 | 70 | 4.0 | 4.1 | 16.4 | 105 | 2 |
| C. Ex. 2 | 218 | 243 | 25 | 231 | 65 | 70 | 4.0 | 4.1 | 16.4 | 92 | 2 |
| C. Ex. 3 | 212 | 223 | 11 | 218 | 60 | 65 | 4.0 | 4.1 | 16.4 | 105 | 2 |
| C. Ex. 4 | 212 | 233 | 21 | 223 | 60 | 65 | 4.0 | 4.1 | 16.4 | 107 | 2 |
| C. Ex. 5 | 212 | 233 | 21 | 223 | 60 | 65 | 4.0 | 4.1 | 16.4 | 80 | 2 |
| C. Ex. 6 | 189 | 209 | 20 | 199 | 55 | 60 | 4.0 | 4.1 | 16.4 | 90 | 2 |
| C. Ex. 7 | 207 | 235 | 28 | 221 | 65 | 70 | 4.0 | 4.1 | 16.4 | 107 | 2 |
| C. Ex. 8 | 212 | 223 | 11 | 218 | 60 | 65 | 3.4 | 3.6 | 12.2 | 105 | 2 |
| C. Ex. 9 | 212 | 223 | 11 | 218 | 60 | 65 | 4.0 | 4.1 | 16.4 | 80 | 2 |
| C. Ex. 10 | 212 | 223 | 11 | 218 | 60 | 65 | 4.0 | 4.1 | 16.4 | 92 | 2 |

Ex.: Example
C. Ex.: Comparative Example

TABLE 2

| | heat shrinkage factor (%) at 100° C. × 10 minutes | | heat shrinkage factor (%) at 60° C. × 120 minutes | | intrinsic viscosity | ΔF(*) (kgf) | lubricant | | | | |
|---|---|---|---|---|---|---|---|---|---|---|---|
| | MD | TD | MD | TD | | | type | aspect ratio | R1/R2 (μm) | average particle diameter ratio | standard deviation |
| Ex. 1 | 19 | 20 | 1.5 | 1.0 | 0.61 | 0.07 | spherical silica | 1.07 | 1.5/0.3 | 5 | 0.1 |
| Ex. 2 | 19 | 20 | 1.5 | 1.0 | 0.58 | 0.05 | spherical silica | 1.07 | 1.5/0.3 | 5 | 0.1 |
| Ex. 3 | 18 | 21 | 1.4 | 1.1 | 0.58 | 0.05 | spherical silica | 1.07 | 1.5/0.3 | 5 | 0.1 |
| Ex. 4 | 18 | 21 | 1.4 | 1.1 | 0.58 | 0.05 | spherical silica | 1.07 | 1.5/0.3 | 5 | 0.1 |

TABLE 2-continued

|  | heat shrinkage factor (%) at 100° C. × 10 minutes | | heat shrinkage factor (%) at 60° C. × 120 minutes | | intrinsic viscosity | ΔF(*) (kgf) | lubricant | | | | |
|---|---|---|---|---|---|---|---|---|---|---|---|
|  | MD | TD | MD | TD |  |  | type | aspect ratio | R1/R2 (μm) | average particle diameter ratio | standard deviation |
| Ex. 5 | 16 | 17 | 1.2 | 0.8 | 0.61 | 0.07 | spherical silica | 1.07 | 1.5/0.3 | 5 | 0.1 |
| Ex. 6 | 23 | 24 | 1.9 | 1.8 | 0.61 | 0.04 | spherical silica | 1.07 | 1.5/0.3 | 5 | 0.1 |
| Ex. 7 | 17 | 18 | 1.4 | 0.9 | 0.61 | 0.07 | spherical silica | 1.07 | 1.0/0.5 | 2 | 0.1 |
| Ex. 8 | 22 | 24 | 1.8 | 1.8 | 0.61 | 0.05 | spherical silica | 1.07 | 1.8/0.1 | 18 | 0.1 |
| Ex. 9 | 19 | 20 | 1.5 | 1.0 | 0.61 | 0.07 | spherical silica | 1.07 | 1.5/0.3 | 5 | 0.1 |
| Ex. 10 | 19 | 20 | 1.5 | 1.0 | 0.61 | 0.07 | spherical silica | 1.07 | 1.5/0.3 | 5 | 0.1 |
| Ex. 11 | 19 | 20 | 1.5 | 1.0 | 0.61 | 0.07 | spherical silica | 1.07 | 1.5/0.3 | 5 | 0.1 |
| C. Ex. 1 | 13 | 14 | 1.0 | 0.7 | 0.61 | 0.20 | spherical silica | 1.07 | 1.5/0.3 | 5 | 0.1 |
| C. Ex. 1 | 19 | 20 | 1.5 | 1.6 | 0.59 | 0.06 | spherical silica | 1.07 | 1.5/0.3 | 5 | 0.1 |
| C. Ex. 3 | 13 | 14 | 1.0 | 0.7 | 0.63 | 0.20 | spherical silica | 1.07 | 1.5/0.3 | 5 | 0.1 |
| C. Ex. 4 | 12 | 13 | 0.9 | 0.6 | 0.60 | 0.22 | spherical silica | 1.07 | 1.5/0.3 | 5 | 0.1 |
| C. Ex. 5 | 27 | 28 | 1.9 | 2.0 | 0.55 | 0.04 | spherical silica | 1.07 | 1.5/0.3 | 5 | 0.1 |
| C. Ex. 6 | 18 | 18 | 1.4 | 0.9 | 0.61 | 0.07 | spherical silica | 1.07 | 1.5/0.3 | 5 | 0.1 |
| C. Ex. 7 | 13 | 14 | 1.0 | 0.7 | 0.62 | 0.20 | spherical silica | 1.07 | 1.5/0.3 | 5 | 0.1 |
| C. Ex. 8 | 14 | 15 | 1.0 | 0.7 | 0.61 | 0.10 | spherical silica | 1.07 | 1.5/0.3 | 5 | 0.1 |
| C. Ex. 9 | 27 | 28 | 1.9 | 2.0 | 0.61 | 0.04 | spherical silica | 1.07 | 1.5/0.3 | 5 | 0.1 |
| C. Ex. 10 | 19 | 20 | 1.5 | 1.0 | 0.61 | 0.07 | spherical silica | 1.07 | 1.5/0.3 | 5 | 0.1 |

(*)ΔF = (load at 50% elongation) − (load at 10% elongation)
sample width of 10 mm, sample thickness of 1.5 μm
Ex.: Example
C. Ex.: Comparative Example

TABLE 3

|  | character printing | | | | solid printing | | |
|---|---|---|---|---|---|---|---|
|  | clearness | missing part of character | thickness | thickness nonuniformity | clearness | size reproducibility | nonuniformity in printing density |
| Ex. 1 | A | ○ | ○ | ○ | ○ | ○ | ○ |
| Ex. 2 | A | ○ | ○ | ○ | ○ | ○ | ○ |
| Ex. 3 | A | ○ | ○ | ○ | ○ | ○ | ○ |
| Ex. 4 | A | ○ | ○ | ○ | ○ | ○ | ○ |
| Ex. 5 | A | ○ | ○ | ○ | ○ | ○ | ○ |
| Ex. 6 | A | ○ | ○ | ○ | ○ | ○ | ○ |
| Ex. 7 | A | ○ | ○ | ○ | ○ | ○ | ○ |
| Ex. 8 | A | ○ | ○ | ○ | ○ | ○ | ○ |
| Ex. 9 | A | ○ | ○ | ○ | ○ | ○ | ○ |
| Ex. 10 | A | ○ | ○ | ○ | ○ | ○ | ○ |
| Ex. 11 | A | ○ | ○ | ○ | ○ | ○ | ○ |
| C. Ex. 1 | C | × | × | × | × | × | × |
| C. Ex. 2 | A | × | × | Δ | Δ | × | × |
| C. Ex. 3 | B | × | ○ | × | Δ | Δ | × |
| C. Ex. 4 | C | × | × | Δ | × | × | × |
| C. Ex. 5 | C | Δ | ○ | × | ○ | Δ | ○ |
| C. Ex. 6 |  |  |  | difficult to form film |  |  |  |
| C. Ex. 7 | C | × | × | × | × | × | Δ |
| C. Ex. 8 | C | × | × | Δ | Δ | × | Δ |
| C. Ex. 9 | C | Δ | ○ | × | ○ | Δ | Δ |
| C. Ex. 10 | C | × | × | ○ | × | × | ○ |

|  | adhesion to base sheet | sensitivity | productivity | winding properties | storage properties |
|---|---|---|---|---|---|
| Ex. 1 | ○ | 5H | ◉ | ◉ | ◉ |
| Ex. 2 | ○ | 5H | ◉ | ◉ | ◉ |
| Ex. 3 | ○ | 4H | ◉ | ◉ | ◉ |
| Ex. 4 | ○ | 5H | ◉ | ◉ | ◉ |
| Ex. 5 | ○ | 4H | ◉ | ◉ | ◉ |
| Ex. 6 | ○ | 5H | ○ | ◉ | ○ |
| Ex. 7 | ○ | 5H | ◉ | ○ | ◉ |
| Ex. 8 | ○ | 4H | ○ | ◉ | ◉ |
| Ex. 9 | ○ | 5H | ◉ | ◉ | ◉ |
| Ex. 10 | ○ | 3H | ◉ | ◉ | ◉ |
| Ex. 11 | ○ | 4H | ◉ | ◉ | ◉ |
| C. Ex. 1 | ○ | H | ◉ | ◉ | ◉ |
| C. Ex. 2 | ○ | 5H | ◉ | ◉ | ◉ |
| C. Ex. 3 | ○ | 2H | ◉ | ◉ | ◉ |

TABLE 3-continued

|   |   |   |   |   |   |
|---|---|---|---|---|---|
| C. Ex. 4 | ○ | H | ○ | ◎ | ◎ |
| C. Ex. 5 | Δ | 3H | × | ◎ | ○ |
| C. Ex. 6 | difficult to form film | | ×× | — | — |
| C. Ex. 7 | ○ | H | ◎ | ◎ | ◎ |
| C. Ex. 8 | ○ | H | ◎ | ◎ | ◎ |
| C. Ex. 9 | Δ | 5H | ○ | ◎ | ◎ |
| C. Ex. 10 | ○ | H | ◎ | ◎ | ◎ |

Ex.: Example
C. Ex.: Comparative Example

What is claimed is:

1. A biaxially oriented polyester film:
   (A) which comprises a composition comprising at least two thermoplastic polyesters;
   (B) which has at least two melting peaks which satisfy the following expressions (1) and (2) when measured by DSC at a temperature elevation rate of 2° C./min by superimposing a periodic temperature variation of ±1° C./min:

$$5° C. \leq Tmp(max) - Tmp(min) \leq 20° C. \quad (1)$$

$$200° C. \leq \tfrac{1}{2}(Tmp(max) + Tmp(min)) \leq 230° C. \quad (2)$$

wherein Tmp(max) is the highest melting peak temperature (° C.) and Tmp(min) is the lowest melting peak temperature (° C.);
   (C) which has on the film plane two crossing directions having a thermal shrinkage factor at 100° C. for 10 minutes of 16 to 25%; and
   (D) which has a thickness of 0.2 to 7 μm.

2. The biaxially oriented polyester film of claim 1, wherein the relationship of the above expression (2) is the relationship of the following expression (2)-1:

$$210° C. \leq \tfrac{1}{2}(Tmp(max) + Tmp(min)) \leq 225° C. \quad (2)\text{-}1$$

wherein Tmp(max) and Tmp(min) are as defined in the above expression (2).

3. The biaxially oriented polyester film of claim 1 which has on the plane two crossing directions in which the difference between load at 50% elongation and load at 10% elongation when calculated based on a thickness of 1.5 μm and a width of 10 mm in a tensile test is in the range of 0.02 to 0.20 kgf.

4. The biaxially oriented polyester film of claim 1 which has on the plane two crossing directions having a heat shrinkage factor at 60° C. for 120 minutes of 2% or less.

5. The biaxially oriented polyester film of claim 1, wherein the composition comprising at least two thermoplastic polyesters contains spherical silica having an aspect ratio of 1.0 to 1.2 and two peaks within a particle diameter range of 0.5 to 3.0 μm and a particle diameter range of 0.05 to 0.6 μm in a particle size distribution curve, the particle diameter ratio of the two peaks (large particle diameter/small particle diameter) being in the range of 1.5 to 20.

6. The biaxially oriented polyester film of claim 5, wherein the spherical silica consists of two different kinds of spherical silicas which differ from each other in particle size distribution with different peak particle diameters in the particle size distribution curve and have a standard deviation of less than 0.5.

7. The biaxially oriented polyester film of claim 1, wherein the composition comprising at least two thermoplastic polyesters comprises 30 to 70 wt % of a first aromatic polyester which comprises terephthalic acid as the main dicarboxylic acid component and ethylene glycol as the main glycol component, 30 to 70 wt % of a second aromatic polyester which comprises terephthalic acid as the main dicarboxylic acid component and tetramethylene glycol as the main glycol component and 0 to 30 wt % of a third aromatic polyester which comprises terephthalic acid as the main dicarboxylic acid component and hexamethylene glycol as the main glycol component.

8. The biaxially oriented polyester film of claim 1 which has an intrinsic viscosity of 0.05 or more and less than 0.62.

9. The biaxially oriented polyester film of claim 1 which has a thickness of 0.5 to 3.5 μm.

10. A process for using the biaxially oriented polyester film of claim 1 in a thermosensitive stencil printing base sheet.

* * * * *